United States Patent
Kawai

(10) Patent No.: US 7,088,790 B2
(45) Date of Patent: Aug. 8, 2006

(54) CIRCUIT FOR DETECTING A CENTER LEVEL OF A FSK DEMODULATED SIGNAL TO CORRECT SAME

(75) Inventor: Kazuo Kawai, Tokyo (JP)

(73) Assignee: General Research of Electronics, Inc., Tokyo (JP)

( * ) Notice: Subject to any disclaimer, the term of this patent is extended or adjusted under 35 U.S.C. 154(b) by 800 days.

(21) Appl. No.: 10/327,745

(22) Filed: Dec. 23, 2002

(65) Prior Publication Data

US 2003/0147477 A1    Aug. 7, 2003

(30) Foreign Application Priority Data

Feb. 1, 2002    (JP) ............... 2002-025243

(51) Int. Cl.
*H03D 3/00* (2006.01)
(52) U.S. Cl. ...................... 375/334; 329/300
(58) Field of Classification Search ............... 375/272, 375/278, 317, 324, 334; 329/300, 302; 455/234.1, 455/245.1, 247.1
See application file for complete search history.

(56) References Cited

U.S. PATENT DOCUMENTS

| | | | | |
|---|---|---|---|---|
| 5,111,152 A | * | 5/1992 | Makino | ............... 329/300 |
| 6,122,330 A | * | 9/2000 | Motohashi | ............... 375/335 |
| 6,188,733 B1 | * | 2/2001 | Kawai | ............... 375/334 |
| 6,529,565 B1 | * | 3/2003 | Kawai | ............... 375/334 |
| 6,570,937 B1 | * | 5/2003 | Kawai | ............... 375/334 |
| 6,633,752 B1 | * | 10/2003 | Hashigaya | ............... 455/296 |
| 6,891,905 B1 | * | 5/2005 | Malone et al. | ............... 375/334 |

\* cited by examiner

*Primary Examiner*—Khanh Tran
(74) *Attorney, Agent, or Firm*—Flynn, Thiel, Boutell & Tanis, P.C.

(57) ABSTRACT

In demodulation of a FSK signal, a circuit for detecting a center level of said signal and correcting an error thereof is provided. Said circuit can accomplish the detection of the center level correctly always even if there exist cords with various lengths in a length of "1" or "0" of a synchronizing signal at beginning of communication and during communication, and yet frequency variation happens at that time.

Said circuit has sample hold circuits SH1 and SH2 each of which are provided so as to correspond to "1" and "0" of an input demodulated data signal. In said circuit a center level value is an average value of voltages held in said sample hold circuits when said signal changes from "1" to "0" or "0" to "1" and a center level value is obtained by adding or subtracting a voltage of ½ of difference between two hold voltages held in another sample hold circuit SH3 to or from a hold voltage in a receiving side at present time when said signal keeps "1" or "0" continuously.

Data information is judged by a compartor of which a reference value is anyone of said two center level value.

3 Claims, 4 Drawing Sheets

CIRCUIT FOR DETECTING A CENTER LEVEL OF A FSK DEMODULATED SIGNAL TO CORRECT SAME

BACKGROUND OF THE INVENTION

1. Field of the Invention

The present invention relates to an improvement of techniques for constructing a circuit for detecting a center level to correct same necessary to demodulate a FSK (Frequency Shift Keying) signal.

2. Description of the Related Art

In a demodulated output of a FSK signal there is an error in a center level due to various factors, in general, such as a frequency error of a transmitter and a receiver, a frequency error of a frequency discriminator and drift of a d.c. circuit system, etc. For this reason, various methods and circuits for detecting this center level to correct its center error have been conceived and used.

As representatives thereof there are known (1) a method for obtaining a center level of a demodulated base band signal of the FSK signal from an average of peak values held in a positive and a negative peak hold circuit; (2) a method in which there are disposed a positive and a negative dead zone circuit having dead zone voltage widths, which are in accordance with a positive and a negative peak value width, respectively of the demodulated base band signal, and the center error is detected from an output from said dead zone circuit exceeding these dead zone voltage widths in said base band signal; (3) a method for obtaining a center level by integrating a bit synchronizing signal at a beginning of the packet signal over a 2 bit length; (4) a method for obtaining a center level from an average of these sampled values obtained by sampling the bit synchronizing signal twice with an internal of 1 baud sec; etc.

However these methods have disadvantages as described below. That is, since, firstly, anyone of them obtains a center level, an error of the center level can be corrected by using it but there is a problem in processing thereafter. If the center level varies thereafter, anyone of methods of (1), (3) and (4) has no following ability with respect to variation of the center level.

According to the method of (2), when said signal varies between "1" and "0" frequently, an error in the center level can be corrected at any time because deviation of the signal from the dead zone can be detected. However, if said signal keeps to have "1" or "0", variation of the center level from "1" or "0" can be detected when it deviates from the dead zone in a direction over said zone but said variation can not be detected when it deviates said zone in a reverse direction.

As is described above, in demodulation of a FSK signal even if the FSK signal keeps to have "1" or "0" at start of communication or during communication, a circuit capable of detecting a center level and correcting an error thereof always has not developed yet.

SUMMARY OF THE INVENTION

So, an object of the present invention is to provide a circuit capable of detecting a center level and correcting same.

In order to attain the above object, a circuit for detecting a center level of a FSK demodulated signal to correct same is characterized by employment of:

control means for holding a sample peak value of a demodulated base band signal of a FSK signal and a second sample value thereof having a polarity opposite to the first sample value in a first or a second sample hold circuit respectively in response to data information of said FSK signal;

average calculation means for calculating a center level value of the demodulated FSK signal by averaging said first and second sample values;

shift width calculation means for calculating a shift width value by taking ½ of difference between the first sample value and the second sample value;

third sample means holding said shift width value in response to said data information;

adder means for adding said shift width value to said first sample value to calculate a center level value;

subtraction means for subtracting said shift width value from said second sample value to calculate a center level value;

selection means for selecting the center level value calculated by said average calculation means, adder means or subtraction means in response to said data information; and judgement means for judging whether a received information data of said FSK signal is "1" or "0" on a basis of a selected center level value.

In the present invention, means for subtracting said selected center level value from said base band signal may be disposed.

Further, in the present invention, means for correcting a center frequency error by feeding back said selected center level value to a local oscillator for frequency conversion of an FSK signal demodulation circuit may be disposed.

DESCRIPTION OF THE PREFERRED EMBODIMENTS

Figure 1:
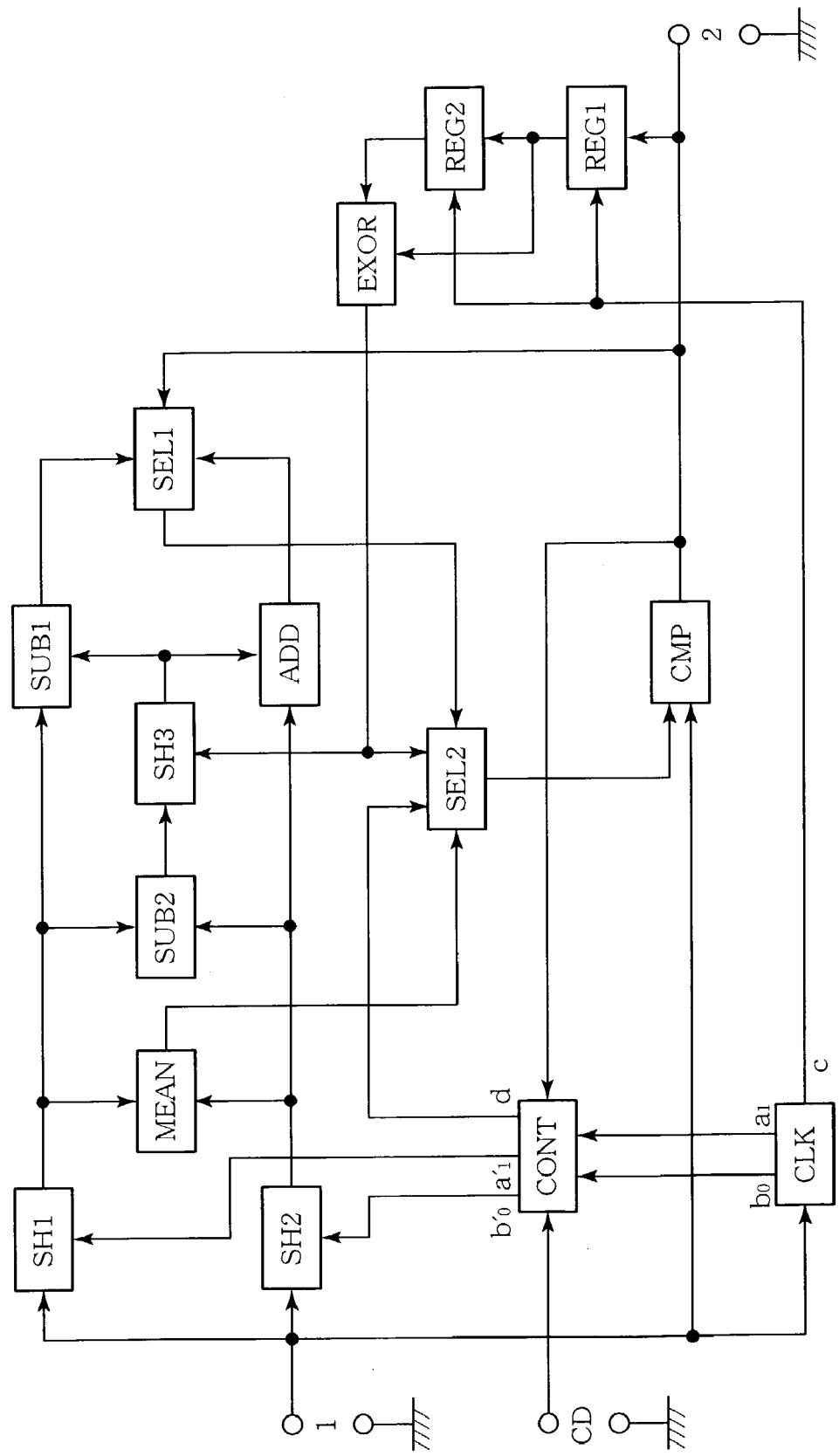
FIG. 1 is a block diagram showing construction of an embodiment of the present invention.

In a circuit of the present invention constructed above, when a FSK demodulated signal takes "1" or "0" alternately, two sample values corresponding to "1" or "0" are held in two hold circuits respectively and an average of outputs from said hold circuits is regarded as a center level value. Further, a voltage of ½ of a voltage corresponding to frequency deviation obtained from difference between outputs of both hold circuits are held in another hold circuit as a shift width voltage and when said signal takes "1" or "0" continuously, a center level value is obtained by adding or subtracting said shift width voltage to or from an output of the hold circuit corresponding to "1" or "0". Since the hold value of "1" or "0" during continuous receiving for obtaining this center level value is up-dated to a new value after the time lapse, always a correct center level value can be obtained if a FSK signal of which a center frequency varies is received.

Hereinbelow an embodiment of a circuit for detecting a center level to correct same of the present invention will be explained, referring to the drawings.

FIG. 1 shows an embodiment of the present invention. In the same figure, 1 is an input terminal of a FSK demodulated signal (a base band signal), 2 is an output terminal of a FSK signal (data information) of which a center level is corrected, CD is an input terminal of a carrier detection signal from a carrier detector (not shown), SH1, SH2 and SH3 are sample hold circuits respectively, MEAN is an average circuit, SUB1 and SUB2 are subtraction circuits respectively, ADD is an adder circuit, SEL1 and SEL2 are selection circuits respectively, CMP is a comparator, CONT is a control circuit, REG1 and REG2 are registers respectively, EXOR is an exclusive or circuit, CLK is a clock reproduction circuit.

Figure 2:
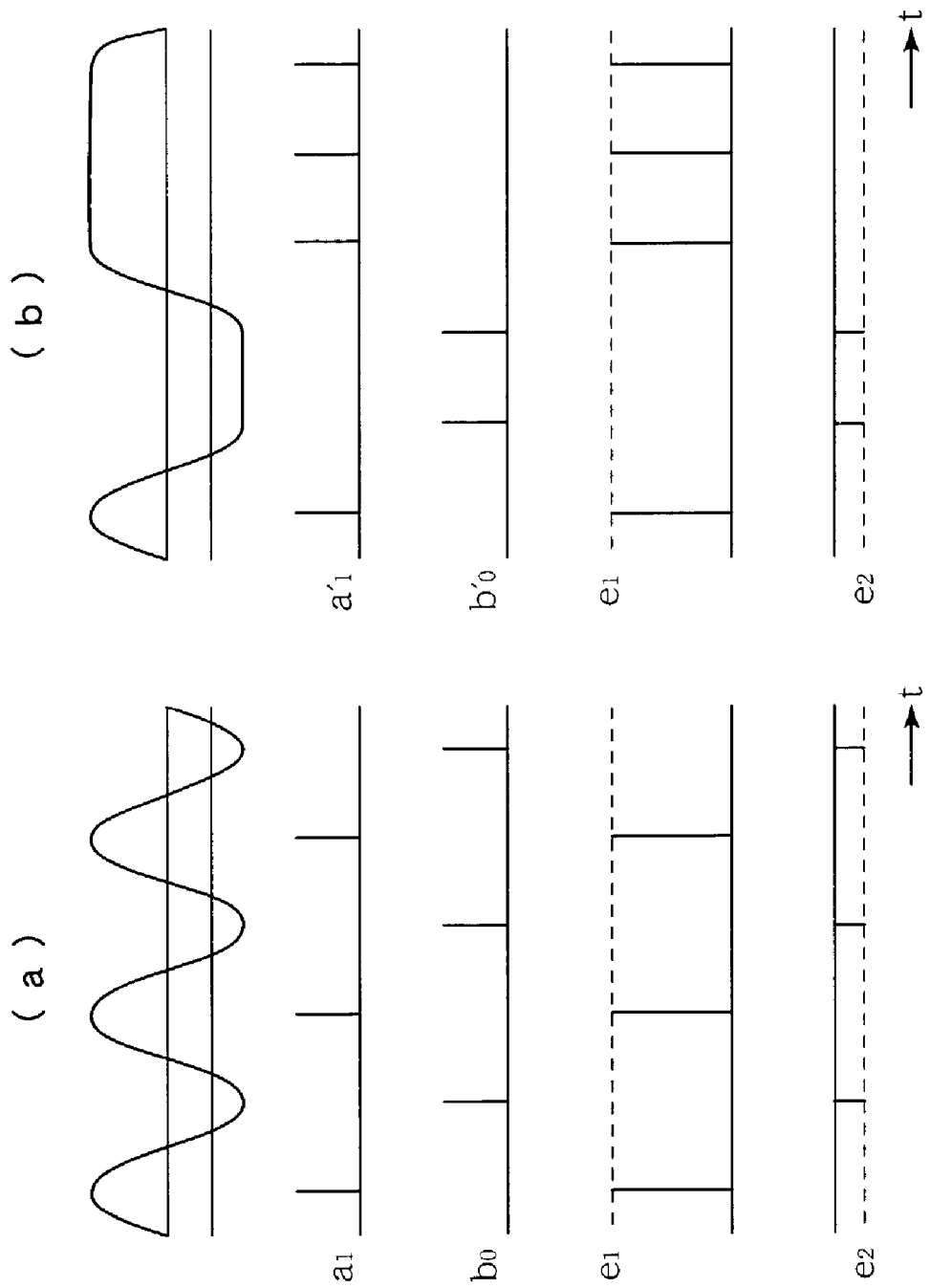
FIG. 2 is a waveform drawing for explaining operation of a circuit of FIG. 1.

Firstly, an FSK demodulated base band signal applied from the signal input terminal 1 is applied to the clock reproduction circuit CLK and a clock signal is reproduced. Reproduced clock signals outputted from the clock reproduction circuits are three kinds of $a_1$, $b_0$ and c. Since $a_1$ is produced at a sample point (a positive peak point) of "1" of a bit synchronizing signal and $b_0$ is produced at a sample point (a negative peak point) of "0" of the bit synchronizing signal, that is, $a_1$ is produced at a time when "1" should be sampled and $b_0$ is produced at a time when "0" should be sampled, $a_1$ and $b_0$ are produced every 1/baud (sec) of information alternately and c is produced at all sample points containing said both sample points. Waveform drawings of FIG. 2(a) show this time relation.

Further, since the control circuit CONT produces $a_1$ to $a'_1$ and produces $b_0$ to $b'_0$ as it is by a carrier detection signal CD from the carrier detection circuit when the bit synchronizing signal is begun to be received, a positive peak voltage $e_1$ (a sample value) is held in the sample hold circuit SH1 and a negative peak voltage $e_2$ (a sample value) is held in the sample hold circuit SH2 respectively. A dotted line shown in FIG. 2(a) indicates these hold voltages. Both peak voltages are applied to the average circuit MEAN and an average value thereof, that is, a center level value $(e_1+e_2)/2$ is obtained. Since an d output of the control circuit is produced only at this initial operation to operate the selection circuit SEL2 preferably and to switch an output of the average circuit MEAN to the comparator CMP, a center level correspondence value as a reference value of the comparator is applied to it and the comparator COM begins to do normal judgement operation to the data base signal to output data information "1" and "0". Also, at this time, the subtraction circuit SUB2 produces ½ of difference of said both voltages, that is, $(e_1-e_2)/2$. Since this voltage corresponds to a width from the center level value to the positive or negative peak value, said shift width voltage is this voltage.

After transmission of the bit synchronizing signal having predetermined bit numbers of the FSK demodulated signal is completed, usually, transmission of information bits of a frame synchronizing signal, etc. is begun and the control circuit CONT shifts to condition at communicating time, that is, to a normal mode. At this mode, a sampled pulse which is an output from the control circuit CONT is controlled by the out of the comparator CMP to output $a'_1$ when a data information (information data) is "1" and to hold that sample value in the sample hold circuit SH1 or to output $b'_0$ when a data information is "0" and to hold that sample value in the sample hold circuit SH2. That is, it is determined by the output of the comparator CMP that said sample value is held in any of said two hold circuits SH1 and SH2 every bits. According to this, the sample value $e_1$ is held always in the sample hold circuit SH1 when the data information is "1" and the sample value $e_2$ is held always in the sample hold circuit SH2 when the data information is "0". Time relation between the signal waveform and the sampled pulse at this time is shown in FIG. 2(b).

On the other hand, since a shift resistor is constructed by the resistors REG1 and REG2 which are operated by clocks with data speed from the clock reproduction circuit CLK, present data is stored in the resistor REG1 always and data prior to one bit is stored in the resistor REG2 always. Since the input and the output of the resistor REG2 are applied to the exclusive or circuit EXOR respectively, said circuit EXOR produces "1" when said data information is "10" or "01", and produces "0" when it is "11" or "00". That is, "1" is produced when there is variation from "1" to "0" or "0" to "1" and "0" is produced when "1" or "0" continues.

Since the sample hold circuit SH3 is controlled by the output of the exclusive or circuit EXOR, the output of the subtraction circuit SUB2 is held when the data information keeps "1" or "0" and does not vary. Since this hold voltage is said shift width voltage $(e_1-e_2)/2$, an output of the subtraction circuit SUB1 becomes $e_1-\{(e_1-e_2)/2\}=(e_1+e_2)/2$ and a center level value is obtained and in the same way the shift width voltage is added to $e_2$ in the adder circuit ADD to obtain a center level value $(e_1+e_2)/2$. The center level value is obtained by subtracting the shift width voltage from $e_1$ or by adding the shift width voltage to $e_2$ but since both of $e_1$ and $e_2$ are hold voltages, a hold voltage at present coming signal side as voltage information is new. So, the selection circuit SEL1 selects the present coming signal side by using an output of the comparator CMP.

As previously described, the center level value obtained as an average value of both outputs of the hold circuits SH1 and SH2 appears at an output of the average circuit MEAN and this value varies every hour. Therefore, it is preferred to use this center level value when the data information changes from "1" to "0" or "0" to "1" frequently and when "1" or "0" continues, the center level value obtained by adding or subtracting the obtained shift width voltage to or from any voltage of "1" or "0" is used.

In this way, a FSK demodulated signal (data information) of which the center level value is corrected is obtained at the terminal 2. Anyone of said center level values is selected by the selection circuit SEL2.

Figure 3:
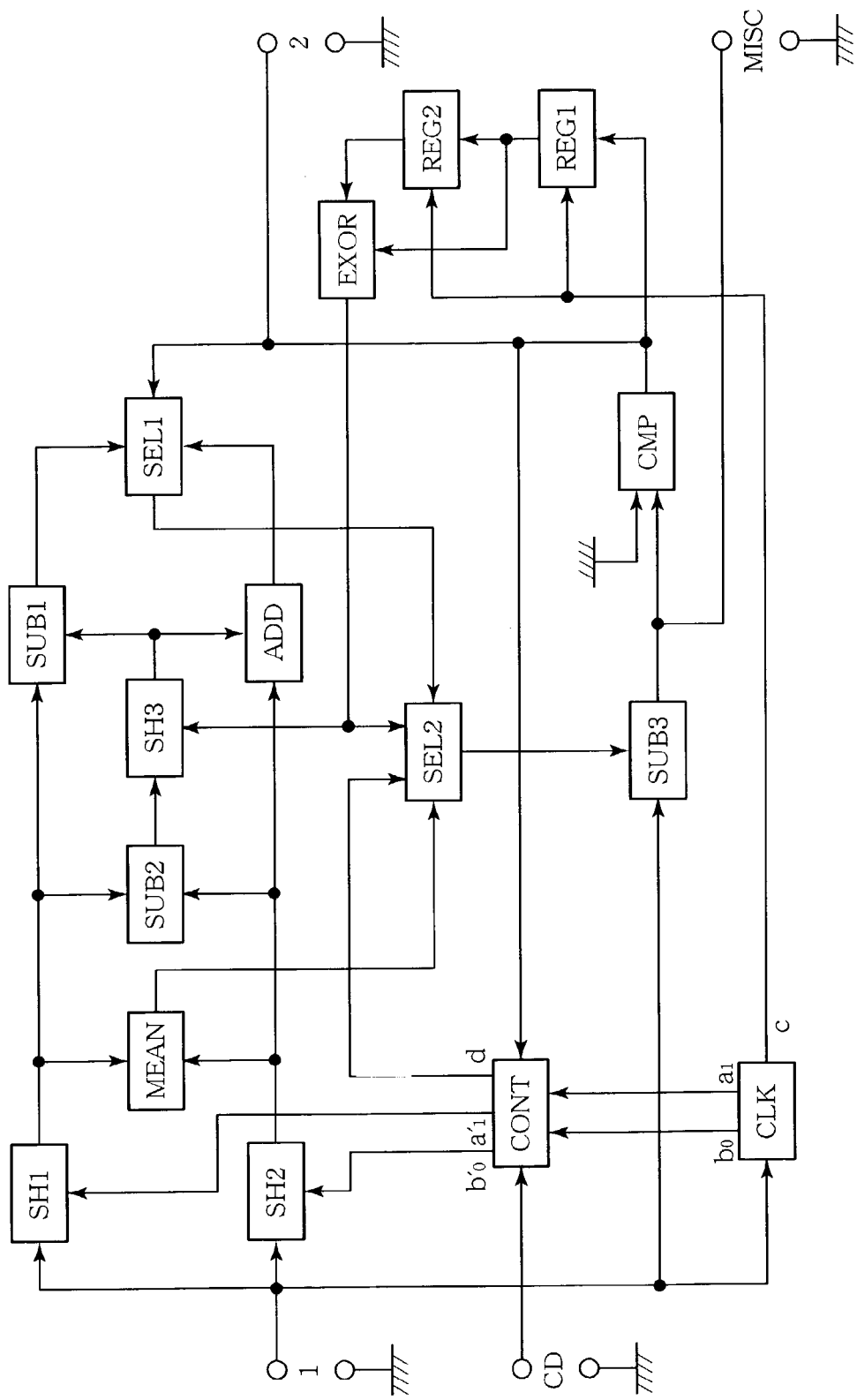
FIG. 3 is a block diagram showing construction of another embodiment of the present invention.

A method for utilizing the obtained center level value as a reference voltage of the comparator CMP is described above but if a base band signal of which a center error is zero is necessary for other purpose, a method shown in FIG. 3 may be used. In FIG. 3, SUB3 is a subtraction circuit, MISC is an output terminal for other purpose and the subtraction circuit SUB3 subtracts the center level value from the base band signal to output a subtracted result to the output terminal MISC.

Figure 4:
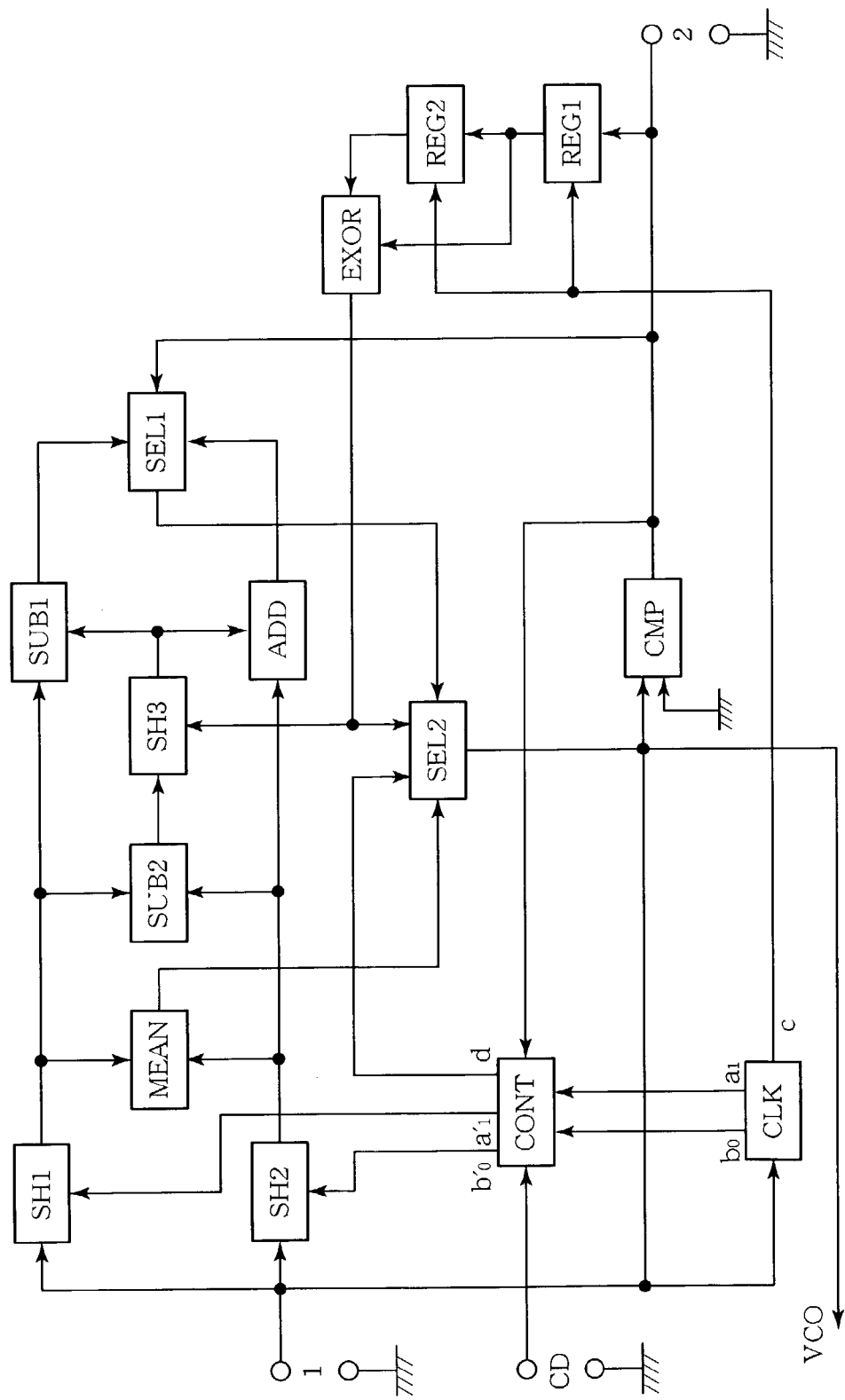
FIG. 4 is a block diagram showing construction of further another embodiment of the present invention.

Furthermore, there is such a case that AFC (Automatic Frequency Control) is necessary for effective utilization of band width of an intermediate frequency amplifier and improvement of SN ratio, etc. in a FSK demodulation circuit. In this case, a circuit is so constructed that an center level detected output is fed back to a frequency conversion local oscillator VCO (a Voltage Controlled Oscillator) to control its oscillation frequency as shown in FIG. 4.

As is explained above, according to the present invention, even if "1" or "0" of data information continues for long times in demodulation of a FSK signal, a center level can be detected by adding or subtracting a shift width voltage to or from a signal voltage which is received at the present time because a shift width is stored as a voltage. Thus an AFC system wherein "1" or "0" of the center level is judged by a reference comparator and this center level is fed back, can be constructed. In the present invention, since the center level can be detected by a signal which is received at the present time in this way, variation of the center level can be detected correctly with no relation to control of a transmitted cord.

What is claimed is:

1. A circuit for detecting a center level of a frequency shift keying (FSK) demodulated signal to correct same comprising:

control means for holding a sample peak value of a demodulated base band signal of a FSK signal and a second sample value thereof having a polarity opposite to the first sample value in a first or a second sample hold circuit respectively in response to data information of said FSK signal;

average calculation means for calculating a center level value of the demodulated FSK signal by averaging said first and second sample values;

shift width calculation means for calculating a shift width value by taking ½ of difference between the first sample value and the second sample value;

third sample means holding said shift width value in response to said data information;

adder means for adding said shift width value to said first sample value to calculate a center level value;

subtraction means for subtracting said shift width value from said second sample value to calculate a center level value;

selection means for selecting the center level value calculated by said average calculation means, adder means or subtraction means in response to said data information; and judgement means for judging whether a received information data of said FSK signal is "1" or "0" on a basis of a selected center level value.

2. A circuit according to claim 1 further comprising means for subtracting said selected center level value from said base band signal.

3. A circuit according to claim 1 further comprising means for correcting a center frequency error by feeding back said selected center level value to a local oscillator for frequency conversion of an FSK signal demodulation circuit.

* * * * *